United States Patent [19]
Kensrue

[11] 3,779,444
[45] Dec. 18, 1973

[54] POWER PROPELLED WELDING AND CUTTING APPARATUS

[76] Inventor: Milo M. Kensrue, 11031 Cherryhill Dr., Santa Ana, Calif. 92705

[22] Filed: Mar. 2, 1972

[21] Appl. No.: 231,419

Related U.S. Application Data

[63] Continuation of Ser. No. 29,914, April 20, 1970, abandoned.

[52] U.S. Cl. .................... 228/4, 29/200 P, 29/457, 219/125, 228/44, 228/45
[51] Int. Cl. .......................................... B23k 37/04
[58] Field of Search .................... 228/4, 44, 45, 25; 29/200 J, 200 P, 457; 219/124, 125

[56] References Cited
UNITED STATES PATENTS

| | | | |
|---|---|---|---|
| 2,017,429 | 10/1935 | Anderson | 266/23 |
| 3,167,636 | 1/1965 | Bosteel | 219/125 R |
| 3,444,352 | 5/1969 | Ogden et al. | 219/125 R |
| 3,560,698 | 2/1971 | Taylor | 219/125 PL |
| 3,670,139 | 6/1972 | Pandjiris | 219/125 R |

*Primary Examiner*—Robert D. Baldwin
*Assistant Examiner*—Robert J. Craig
*Attorney*—Whann & McManigal

[57] ABSTRACT

Power propelled apparatus for welding, cutting and similar work operations, in which a wheel supported carriage attached to an elongate workpiece is movably guided therealong while performing the particular work operation along a desired locus line on the workpiece, the attached carriage having driving elements operable into clamped driving engagement with a portion of the workpiece, for example, the web of an I-member or other structural member. Appropriate tool means, such as one or more cutting torches, welding torches or the like, are mounted on the carriage and are continuously automatically oriented so as to track the locus line during carriage movement and perform the work operation therealong. For arc welding use, the torch has a nozzle into which an appropriate gas is fed, together with a welding electrode wire supplied from a source on the carriage. Adjustable control means provides for variations to meet different operating requirements, and includes means for automatically stopping and shutting off the apparatus upon its reaching the end of the workpiece.

31 Claims, 14 Drawing Figures

MILO M. KENSRUE
INVENTOR
WHANN & McMANIGAL
Attorneys for Applicant
BY

MILO M. KENSRUE
INVENTOR
WHANN & McMANIGAL
Attorneys for Applicant
BY

MILO M. KENSRUE
INVENTOR
WHANN & McMANIGAL
Attorneys for Applicant

POWER PROPELLED WELDING AND CUTTING APPARATUS

This application is a continuation of Ser. No. 29,914, now abandoned.

BACKGROUND OF THE INVENTION

The present invention relates generally to material working apparatus.

A great need has arisen in certain types of industry for apparatus which could be connected to an elongate workpiece and propelled therealong to automatically perform a work operation on the workpiece, such a cutting, welding, and the like. This is particularly true in the shipbuilding industry where elongate stiffener members, such as T-members, I-members, and members of other shapes must be modified, for example, by cutting operations, or where such members are to be secured, usually in an upright position, along plate sections, such as may be utilized to form ships' hulls, partitions, bulkheads and the like of the ship framing structure. It is the present practice to fabricate large frame sections with the plate members in a generally horizontal position, and with the stiffeners being positioned in a generally upright position thereon. Heretofore, it has been the usual practice to employ scores of hand welders to manually carry out the job of fabricating the stiffeners and plate members. Such procedures are extremely uneconomical and costly, and because of the varied abilities of the welders the resulting welds were not as a rule of a uniform and dependable character to assure a consistent and dependable fabricated product.

A number of attempts have heretofore been made to solve the problems inherent in the above-noted procedures, and a few power driven welders have been built in an attempt to produce apparatus which would accomplish a line-seam welding operation on at leat a semi-automatic basis. Such prior aparatus has left much to be desired, and was in the main very large, heavy and difficult to operate and maintain. In some cases, it required the constant attention of two or three persons in order to keep it running and operating. Tracking difficulties were a constant problem and required continuous attention and adjustment in order to keep the welding torches on the seam line.

In the apparatus according to the present invention, the problems inherent in the prior apparatus have been overcome by the use of novel and unique concepts as embodied in the guiding and positive driving mechanisms, torch control and torch tracking mechanisms, electrode wire feed mechanism, together with other design features which result in easier handling and maintenance. Once the apparatus of the herein disclosed invention is attached to the workpiece, it will continue to carry out the work operation automatically without the constant attention of an operator, and one person may simultaneously supervise the operation of several machines.

SUMMARY OF THE INVENTION

The present invention relates generally to power propelled apparatus for attachment to a workpiece, and movement therealong while automatically carrying out a work operation, such as cutting, welding and the like.

Having in mind the inherent disadvantages of currently available apparatus for the above expressed purpose, it is one object of the herein described invention to provide improved apparatus which is of relatively light weight, easy to handle, which can be readily attached to a workpiece to carry out a work operation thereon; and which can be operated unattended for a relatively long period of time.

A further object of the invention is to provide a compact low inverted U-shaped main frame structure in material working apparatus which is adapted to straddle workpieces of variable height upon which a work operation is to be performed, and which is supported on wheels permitting movement of the frame structure along the longitudinal axis of the workpiece.

A further object resides in the provision of an improved unique positive driving connection between the main frame and surfaces of the workpiece, which includes driving and clamping wheels engageable with opposite side surfaces of a longitudinally extending portion of an associated workpiece, the clamping wheels being supported for clamping and unclamping movements by a parallel motion linkage assembly.

A further object is to provide improved mounting means for supporting a work operation torch on one or both sides of the frame structure which permits selective individual adjustments of each torch in endwise, generally angular upward and downward pivotal swinging movements, and lateral adjusting movements, and whereby torches on opposite sides of the workpiece are positionable in staggered relation.

A still further object is to provide, in addition to the above mentioned torch support adjustments, a further adjustment which permits the angular position of the torch to be readily moved in an arc having a radius of curvature centered generally at the working end of the torch.

Another object of the herein described invention is to provide an arrangement wherein the torches are supported rearwardly of the driving mechanism so that operations of the torch may be readily observed, and wherein the torches are provided with unique tracking wheels for continually orienting and maintaining the working ends of the torches in proper relation with respect to a work performing locus line.

Still another object is to provide in the case of arc welding torches, unique means for feeding electrode wires to the welding torches from supply reels carried by the main frame structure.

It is also an object to provide unique control means whereby the respective operating functions of the apparatus are readily adjustable to meet varied operational requirements and conditions, and including safety control means for automatically shutting down and terminating the operations of the apparatus upon its reaching an end of the workpiece upon which it is being operated.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only.

DESCRIPTION OF THE PREFERRED EMBODIMENT

Figure 1:
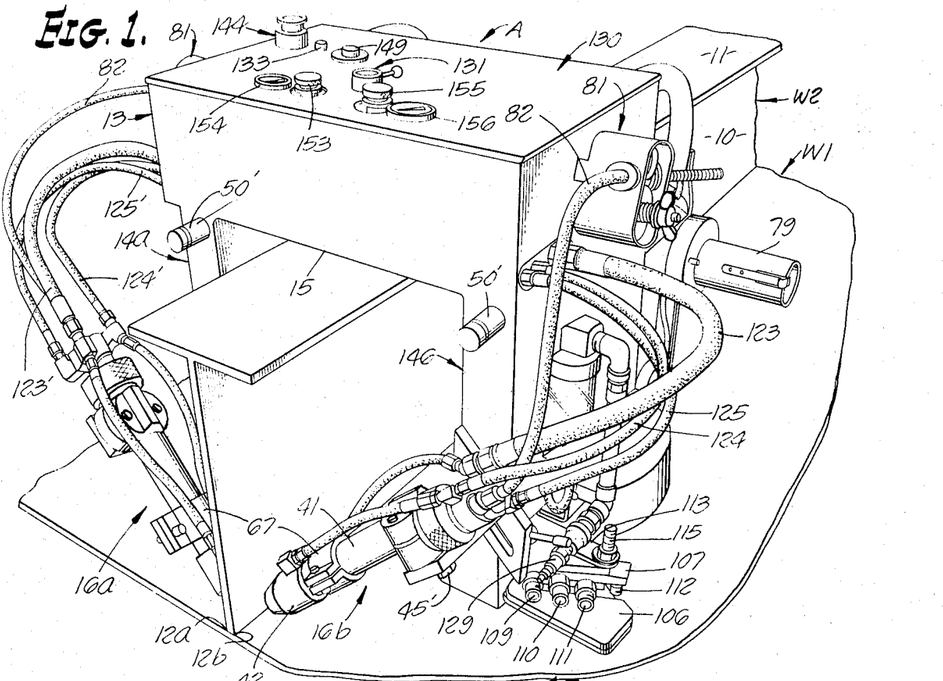
FIG. 1 is a perspective view of apparatus according to the present invention, the apparatus being shown in its associated position as applied to a workpiece upon which a work operation is to be performed.
Figure 2:
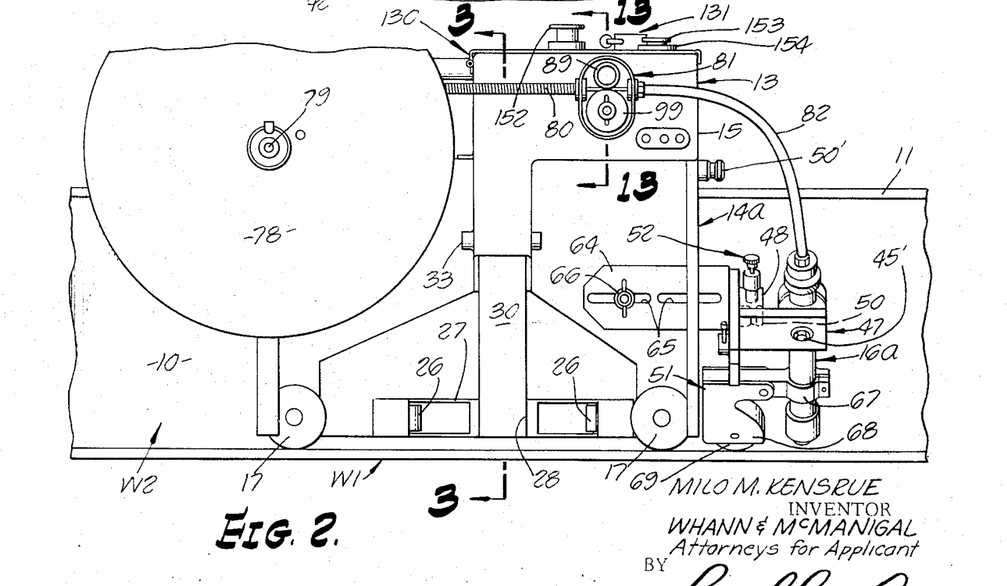
FIG. 2 is a side elevational view of the same.

Referring now more specifically to the drawings, the apparatus of the present invention is illustrated herein as being embodied in apparatus for carrying out an arc welding operation. As shown in FIG. 1, the apparatus, as generally indicated at A, is operatively associated with workpieces which in this case comprise a workpiece W1 in the form of a plate member, and W2 which is shown as a T-member having a web 10 and a right-angled edge flange 11. The workpiece W2 is positioned with its web portion in right-angled relation to the plane of the workpiece W1, the flange 11 being disposed uppermost. In this position, the workpiece W2 is tack welded along its lower edge to the workpiece W1 to initially hold the workpieces in the desired assembled relation. The operation of the apparatus is to now weld the lower edge of the web 10 to the workpiece W1 along a work operation locus line formed thereby, and in this case comprising a line of weld on each side of the web 10, as indicated at 12a and 12b respectively.

More specifically, it will be observed that the apparatus embodies a very compact assembly of extremely low configuration and includes a generally inverted U-shaped carriage frame structure 13 which is adapted to straddle the workpiece W2 with leg portions 14a and 14b positioned on opposite sides of the workpiece, while at their uppermost ends, the leg portions are bridged by a top bridging portion as indicated at 15. With this type of construction, the carriage frame is adapted to be positioned over workpieces W2 which may vary as to overall height without changing the relative position of the carriage frame with respect to the workpiece W1.

The leg portions 14a and 14b provide mounts, as will be subsequently explained in greater detail, for working tools for carrying out the work operations, and in this case comprising arc welding torch assemblies, as generally indicated at 16a and 16b, respectively.

Figure 3:
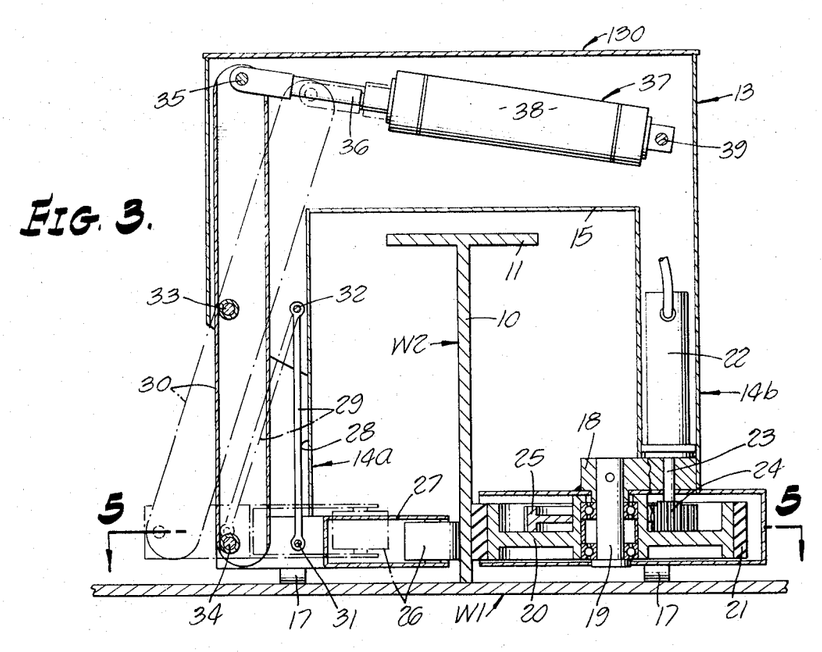
FIG. 3 is a transverse sectional view taken substantially on line 3—3 of FIG. 2, and showing details of the driving mechanism.
Figure 5:
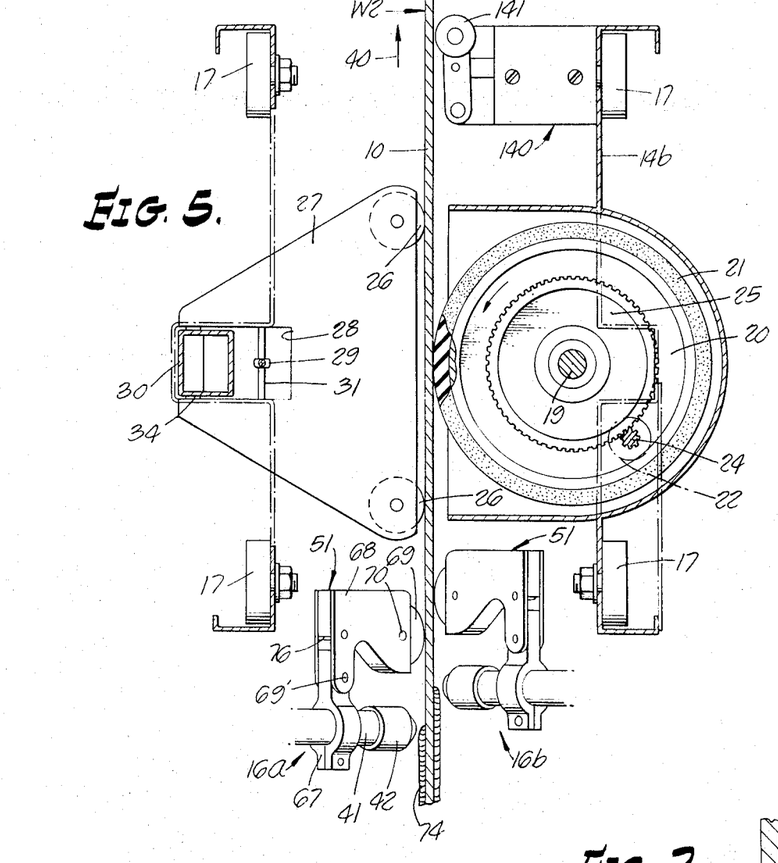
FIG. 5 is a fragmentary section taken substantially on line 5—5 of FIG. 3, and showing the relationship between the driving mechanism and the torches.

As best shown in FIGS. 3 and 5, the carriage frame 13 is supported for linear movement along the workpieces by supporting wheels 17 at the bottom portions of the legs 14a and 14b, these wheels being adapted to movably support the carriage by virtue of engagement with surfaces on opposite sides of the workpiece W2, in this case the exposed upper surface of workpiece W1. An important feature of the herein described apparatus resides in the provision of positive driving means which are connectable with a workpiece and operable to propel the apparatus therealong during the performance of a work operation. In this case, the leg structure 14b, as shown in FIG. 3, is provided with a bracket 18 which supports a depending axle 19 upon which there is rotatably supported a drive wheel 20 which carries a circumferentially extending peripheral band 21 of rubber or other suitable material adapted to drivingly engage an adjacent surface of the workpiece, in this case a surface of the web 10. Power is applied to the drive wheel from a motor power source 22, in this case an air driven motor, having a drive shaft 23 connected with a pinion 24. The pinion 24 has toothed engagement with a driving gear 25 fixedly mounted on the drive wheel 20.

Positive engagement of the drive wheel with the web 10 is secured by means of a pair of spaced apart clamping wheels 26—26 supported on a frame structure 27 on the opposite side of the web 10, this frame structure being supported on the leg portion 14a for movable actuation into and out of clamping position by means of an actuating mechanism which will now be explained. The frame structure 27 is of generally triangular configuration, and at its outermost corner is constructed with a corner opening 28 within which pivotal connection is made with the adequate ends of parallel link members 29 and 30 which provide a parallel linkage support for the frame structure 27, whereby the frame structure will be maintained in a horizontal position during movements into clamped position and unclamped position of the clamping wheels 26—26. The lowermost end of link 29 is pivoted on a pin 31, while the upper end is supported on a pivot pin 32 carried by the leg portion 14a. The link 30 is in the form of a rocker lever which is pivoted intermediate its ends on a pivot 33 on the leg portion 14a, while its lowermost end is connected by a pivot 34 with the frame structure 27. The opposite end of the link 30 extends upwardly into the bridging portion 15 of the carriage frame and is connected by a pivot 35 with the outermost end of a power delivery element 36 of a fluid actuator assembly 37 in which a cylinder 38 is operatively associated with the power delivery element 36. At its opposite end, the cylinder 38 is pivotally supported on a pivot 39 affixed to the carriage frame. With the arrangement just described, it will appear that when the power delivery element is in retracted position, as shown in phantom lines, the clamping wheels will be disengaged from the web 10, while in the extended position of the power delivery element, as shown in full lines, the clamping wheels will be moved into engagement with the web 10 and through this action will orient the carriage frame with respect to the workpiece W2 and cause the driving wheel to positively engage the workpiece so as to propel the apparatus along the workpiece in the direction shown by the arrow as indicated at 40, when the drive wheel is rotated in a counterclockwise direction as shown in FIG. 5. As thus moved along the workpiece, it will be seen that the torch assemblies 16a and 16b will trail behind the advancing carriage frame and will be in a position where the operation of the torches and the weld produced thereby is readily observable without obstruction of the view by other portions of the apparatus.

Figure 4:
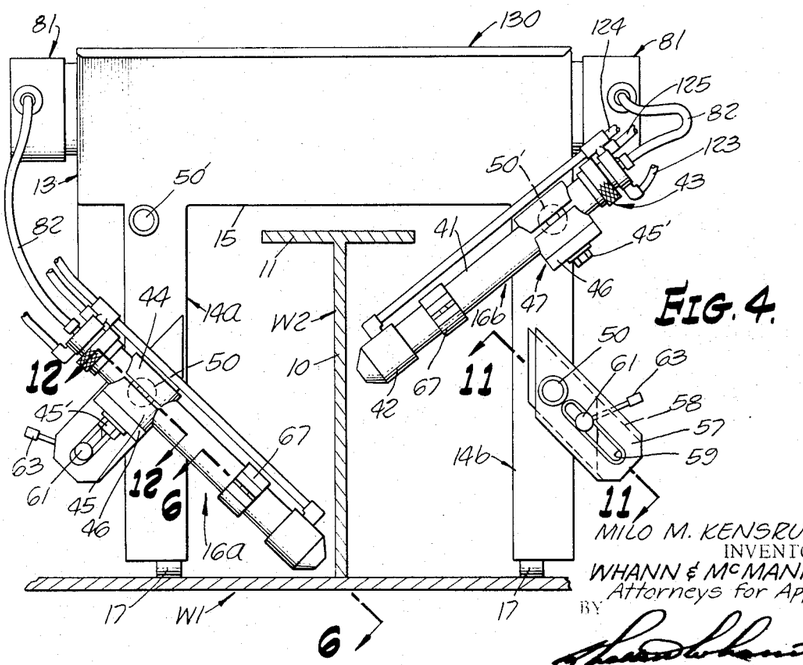
FIG. 4 is a rear end elevational view of the apparatus, showing details of the mounting for the torches and their positions in relation to an associated workpiece.

For an arc welding operation, torches of well known construction are utilized. These torches are of generally cylindrical construction, and as shown in FIG. 4, embody a barrel portion 41 with a gas discharge nozzle 42 at one end, and connection means as generally indicated at 43 for the gas, water, electricity, and the electrode welding wire.

In order to permit use of the apparatus under extensively variable operating conditions and for carrying out different types of work operations, it becomes a necessity that the mounting means be insulated with respect to each torch and have a high degree of flexibility which will permit a multiplicity or universal adjustment of the torch. As shown in FIG. 4, the torch is adjustable longitudinally of its axis within a pair of barrel gripping clamping members 44 and 45 which are carried by a leg 46 of an L-shaped bracket 47. The clamping member 45 is secured to the bracket by a bolt 45' which, upon being loosened, permits the torch to be laterally swingably adjusted about the bolt as a pivot. The other leg 48 of the bracket is provided with a bore passage 49 (FIG. 12) which is adapted to receive endwise therein a pivot stud 50 which swingably supports the torch so that its nozzle 42 may be swung in an arc, thus permitting adjustment of the torch with reference to the line of weld continuously during the welding operation by means of tracking means as generally indicated at 51 (FIG. 6) and which will be described subsequently in detail.

Figures 12, 14:
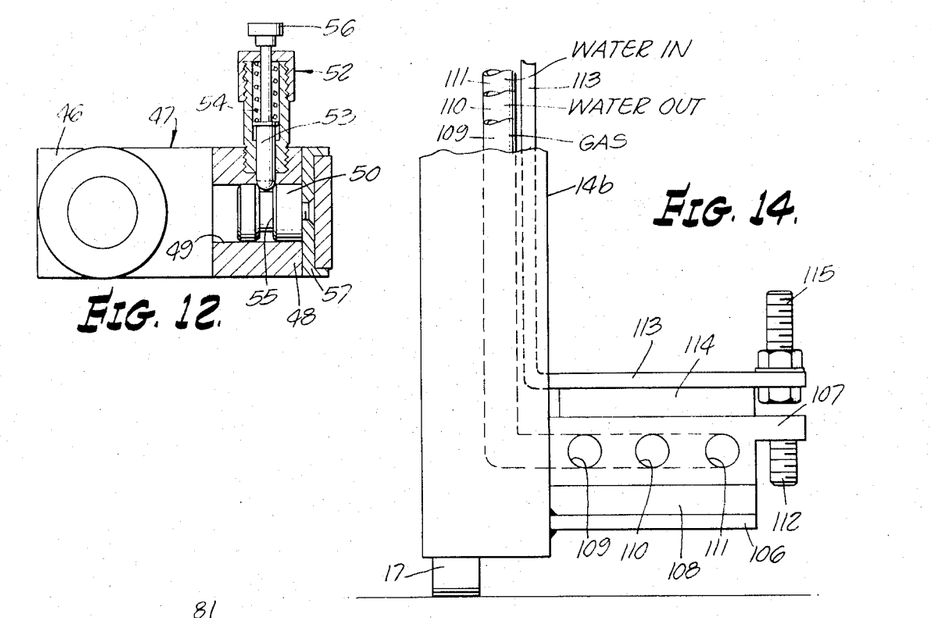
FIG. 12 is a fragmentary detailed sectional view, taken substantially on line 12—12 of FIG. 4, showing means for releasably attaching the torches in operating position and carrying position on the carriage frame structure.
FIG. 14 is a detailed fragmentary view of the bracket for supporting the hose and electrical connections to the apparatus.

The bracket 47 is removably attached to the pivot stud 50 by means of a manually operable detent 52 in which a pin 53 is supported for endwise movement and normally urged by a spring 54 in a direction to cause its end to seat in a circumferentially extending groove 55 of the pivot stud 50. To remove the bracket 47 from the pivot stud 50, the pin may be retracted by means of a digitally engageable button 56. As thus arranged, the releasable detent does not adversely affect the pivot movement of the torch on the pivot stud 50. Upon release of bracket 47 from the pivot stud 50, the entire torch assembly may be shifted as a unit to an auxiliary pivot stud 50' and attached thereto and position the torch in a non-operative position during movements of the apparatus from one job to another.

Again referring to FIG. 4, it will be observed that the pivot stud 50 is secured to a slide member 57 which is guidingly supported for axial movement upon an elongate arm 58, this arm being fixedly secured at an angle to the associated leg portion of the carriage frame 13. The slide member 57 is provided with an elongate slot 59 within which a head portion 60 of a clamping screw 61 is positioned for movement, the screw 61 being positioned in a receiving opening of the arm 58 and having its threaded shank operatively engaged by means of a clamping nut 62 having a manually engageable operating lever 63. The adjustment just described permits the angle of the associated torch to be varied in an arc about its nozzle 42.

Another important adjustment of the torches is to be able to position the torches so that their nozzles will be relatively staggered on opposite sides of the workpiece, for example, the web 10 as shown in FIG. 5. It will be appreciated that in order to accomplish this, it is not necessary that both torches be adjustable laterally, and that it is accordingly only necessary to adjust one of the torch mountings. It will thus be seen that in the case of the torch 16b the arm 58 is in a fixed position. In the mounting for the torch 16a, the arm has been slightly modified as shown at 58' to include a right-angled extending leg 64 which is provided with a series of axially aligned slots 65, 65 which are adapted to receive a threaded stud and wing nut holding means as indicated at 66. With this arrangement, it will be clear that the bracket 58' and the torch assembled thereon may be laterally adjusted to change the staggered relationship between it and the other torch carried by the apparatus.

Figure 6:
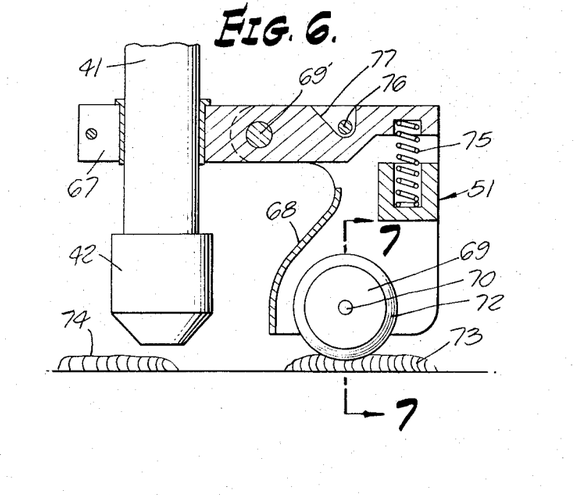
FIG. 6 is a fragmentary sectional view taken substantially on line 6—6 of FIG. 4, and showing details of the means for orienting the torch in relation to the work operation locus line.
Figure 7:
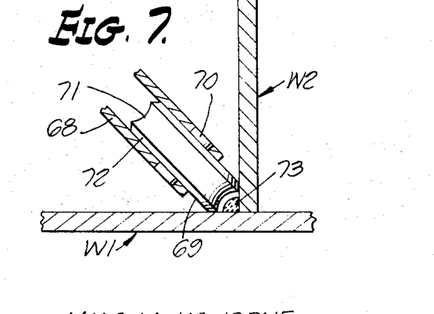
FIG. 7 is a fragmentary section showing the relationship between the orienting elements of the torch and the weld line of the workpiece, taken substantially on line 7—7 of FIG. 6.

In order to provide for proper and necessary tracking of the nozzle 42 during the operation of the device, the tracking means 51 are secured adjacent the nozzle 42 by means of a mounting bracket 67 which is arranged to be clamped to the barrel of the torch adjacent its nozzle 42. This bracket extends laterally of the torch and carries a carriage frame 68 which is supported on a pivot pin 69' for swinging movement in the plane of the longitudinal axis of the torch, but is restrained against relative movement in a direction corresponding to up and down swinging movements of the torch head about its supporting pivot stud 50. The carriage frame 68 rotatably supports a tracking wheel 69, this wheel being rotatable on a central axle 70. At its periphery, the wheel is circumferentially grooved as indicated at 71 and adjacent the sides of the groove the wheel edges are beveled as shown at 72. As thus constructed, the wheel is adapted to ride in the angle between the workpieces W1 and W2 with the beveled edges respectively engaged with the adjacent workpiece. The groove permits the wheel to unobstructedly pass over the tack welds, as indicated at 73, which are made to initially position the workpieces. It will be seen that the wheel serves to orient the nozzle 42 and maintain it in proper position for providing the weld seam, as indicated at 74, or other work operation along the desired locus line. As a protective measure, the wheel carriage is normally urged in a clockwise direction by means of a compression spring 75, one end of this spring being engaged with a part of the carriage frame, while the other end of the spring engages a portion of the bracket 67. The movement of the carriage frame under the force of this spring is limited by a stop pin 76 carried by the carriage frame and adapted to normally occupy a position within a recess or notch 77 formed in the bracket 67. It will thus be evident that if the tracking wheel should, for some reason, engage a slight obstruction in its guiding path, the carriage is free to resiliently move without laterally diverting the nozzle 42 from its operating position. While each nozzle is disclosed as being associated with a single tracking wheel, it will be understood that two tracking wheels might be utilized with each torch, one of these being positioned ahead of the torch in the direction of its travel, while the other is in a following position.

Each work tool, in this case the welding torch, is provided with a separate source of supply for its electrode wire. For this purpose, at the forward end of the apparatus, there is provided on each side of the carriage frame 13 a wire reel 78 which is releasably mounted upon a supporting stub shaft 79, and is preferably frictionally retained against free rotation by suitable means, not shown. This reel is arranged to feed the wire into a flexible wire guide tube 80 through which it is carried to a wire feeding mechanism, as generally indicated at 81, from whence it exits through a tubular guide 82, connected to the connection means 43 of the associated torch.

The wire feeding mechanisms for the respective torches are similarly constructed, and may be driven from its own power device. However, in the present embodiment the wire feeding devices on the opposite sides of the apparatus are driven from a single common drive shaft 83 which extends through the bridging portion of the carriage frame 13 and is rotatably supported in suitable bearings 84—84. The driving power for the shaft 83 is obtained from a fluid energizable motor 85, in this case an air motor having a driving shaft 86. The shaft 86 and shaft 83 are drivingly connected through a chain and sprocket transmission as generally indicated at 87.

Figure 13:
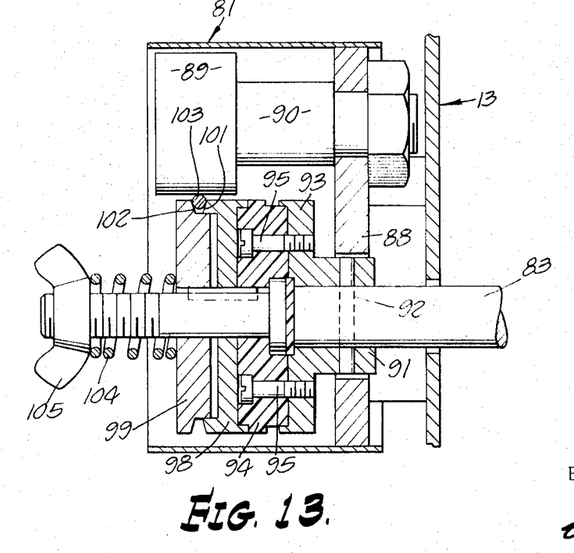
FIG. 13 is a vertical section, taken substantially on line 13—13 of FIG. 2, showing details of the electrode wire feed mechanism.

Referring to FIG. 13, each wire feeding mechanism 81 comprises a frame structure 88 upon which there is mounted an upper metallic idler roller 89, this roller being supported upon a suitable shaft 90 which is insulated with respect to the frame 88.

The end of the drive shaft 83 projects through an opening in the frame 88 and has mounted thereon a metallic hub 91 which is secured to the shaft for rotation therewith by means of a pin 92. This hub has a circumferentially extending inner end flange 93 upon the face of which there is seated an annular insulating member 94 which is secured by means of suitable screws 95—95, the the heads of these screws being recessed in the insulating member. Centrally of the annular insulating member, there is positioned a bolt 96, this bolt having its head portion recessed in the annular insulating member and insulated with respect to the adjacent end of the drive shaft 83 by means of a disc insert 97 of insulating material. The bolt 96 provides a mounting for a pair of cooperatively associated wire driving disc members 98 and 99 which are keyed to the bolt 96 for axial movement thereof by a key member 100. The confronting ends of the driving discs 98 and 99 are in telescoped sliding relation and have cooperatively associated circumferentially extending outer edge marginal portions 101 and 102 which cooperate to form a groove having outwardly diverging walls, this groove being adapted to receive the electrode wire 103 therein during its passage from the flexible wire guide 80 to the tubular guide 82. The portions 101 and 102 are urged into frictional engagement with the electrode wire by means of a compression spring 104 at the outer end of the bolt 96, one end of this spring bearing against the wire driving disc 99, and the other end bearing against a wing nut 105 by means of which the spring pressure may be adjusted, and as a consequence, the force with which the wire 103 is gripped by the wire driving discs 98 and 99. By providing the outwardly diverging portions 101 and 102, the driving discs are readily and automatically adjusted to different wire sizes. These inclined surfaces also serve to cam the wire 103 radially outwardly against the idler roller 89 so as to thereby assure a positive driving feed of the electrode wire to the associated torch.

Referring to FIG. 1, service connections are made to the apparatus on the right side of the carriage frame 13 where the leg portion 14b is provided with a projecting plate support member 106 upon which there is supported a metallic block 107, this block being separated from the support 106 by insulation 108. The block 107 mounts coupling connections to metallic conduits 109, 110, and 111. The block 107 also is formed at its outermost end with a terminal connection 112 which is connectable with an electric supply cable from a welding generator for supplying current to one of the torches. Above the block 107 is a bus bar member 113 which is isolated from the block 107 by insulation 114. The bus bar at its outermost end is provided with a cable connection terminal 115 to supply current from a second electric generating source for the other torch. Electric current is supplied to the respective torches from separate generators. The bus bar 113 serves to carry the current from one generator, while the connected conduits 109, 110, and 111 carry current from the other generator.

Figure 8:
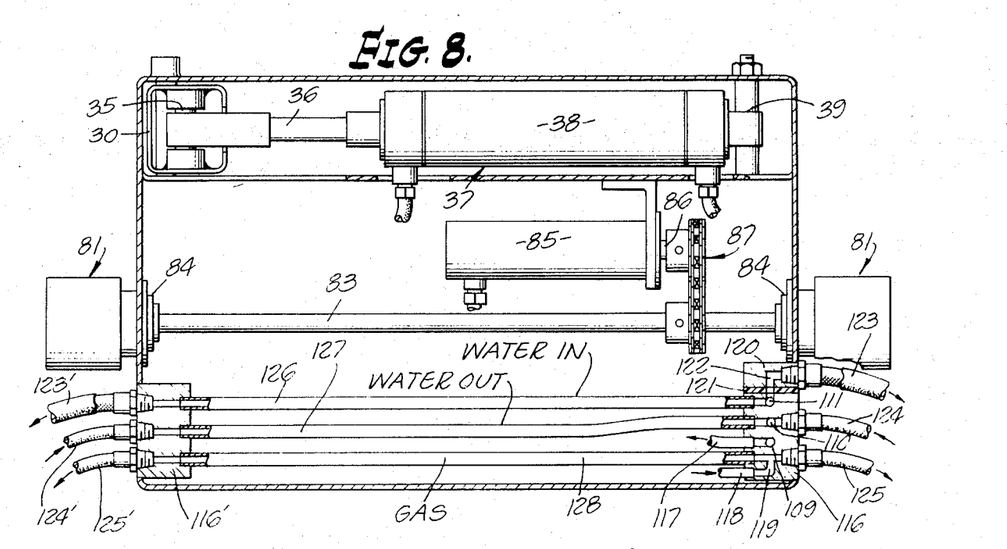
FIG. 8 is a plan section through the bridging portion of the carriage frame showing details of the wire feed driving mechanism and actuator for the means for clampingly engaging the driving wheel.

Referring now to FIG. 8, the uppermost ends of the conduits 109, 110 and 111 are terminated in the bridging portion of the carriage frame in a metal manifold block 116. The conduit 109 is a gas supply conduit, the conduit 110 is a water return conduit, while the conduit 111 is a water supply conduit. From the block 116, a hose connection 117 loads to a gas control valve, and a return hose connection 118 from the gas valve control connects with a passage 119 in the block. At the upper end of the block 116, there is provided a second brass block 120 which is insulated with reference to block 116 by insulation 121. The block 120 is conductively connected with the bus bar 113. A passage 122 connects the conduit 111 with a combination hose 123 through which water and electric current are conducted to the arc welding torch 16b. The conduit 110 connects with a return water hose 124, and the passage 119 connects with a gas supply hose 125 leading to the torch 16b. Metallic tubes 126, 127 and 128 connect the conduits 111, 110 and the passage 119 with similar connection hoses 123', 124', and 125' at a manifold block 116' for the connections to the torch 16a. The tubes 126, 127 and 128 thus serve to carry current to the latter torch. Blocks 116 and 116' are insulated with respect to the carriage frame structure 13.

Air supply for operating the driving motors and actuators of the apparatus is provided through a connection 129 positioned above the bus bar 113.

Figure 9:
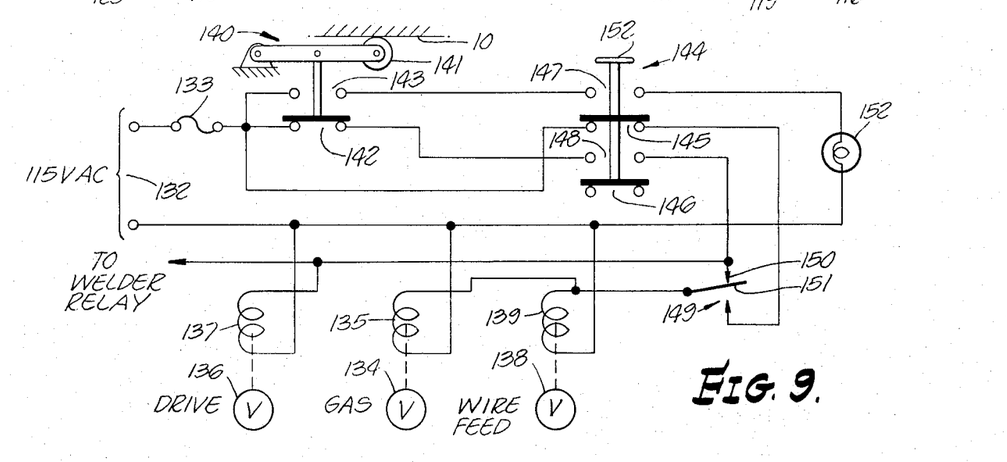
FIG. 9 is a wiring diagram schematically illustrating the electric control for the apparatus.
Figure 10:
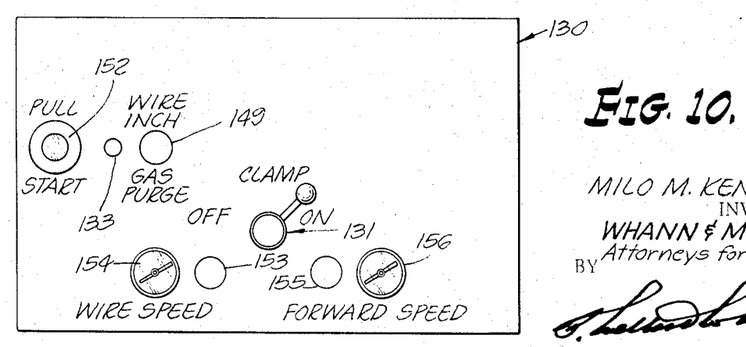
FIG. 10 is a top plan view of the control panel carried by the carriage frame structure.
Figure 11:
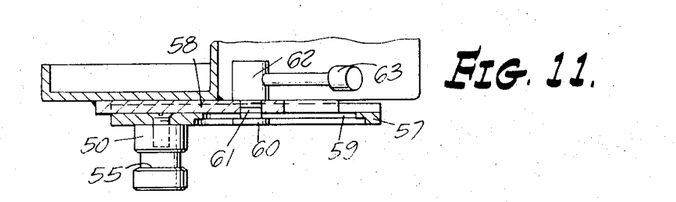
FIG. 11 is a fragmentary detailed view in section, taken substantially on line 11—11 of FIG. 4, showing the clamping adjustment for the torch support bracket means.

Referring to FIGS. 9 and 10, the control components for the apparatus are conveniently mounted upon a control panel 130 which is carried by the bridging portion 15 of the carriage frame. A manually operable control member 131 is operative to ON and OFF positions to control the energization and deenergization of the cylinder 38 and effect clamping and unclamping operation of the clamping wheels 26 for driving and non-driving operation of the apparatus.

As shown in the schematic wiring diagram of the electrical circuitry in FIG. 9, the electric power is obtained from a power source as indicated at 132, a protective fuse 133 being provided in one side of the supply circuit. Gas supply for the torches is controlled by a solenoid valve 134 which has an actuating coil 135. The fluid supply to the drive motor 22 is controlled by a solenoid valve 136 which has an actuating coil 137. The wire feed fluid supply to the motor 85 is controlled by a solenoid valve 138 which has an actuating coil 139. The control also includes a limit switch 140 which is mounted at the forward end of the apparatus as indicated in FIG. 5, this switch having an actuator roller 141 which is adapted to normally engage a surface of a workpiece on which the apparatus is being utilized, and in this position normally close a set of contacts 142 in the electric supply circuit. Upon movement of the apparatus to a position where the roller 141 no longer engages the workpiece, for example, upon reaching the end of the workpiece, the switch will be actuated to open the contacts 142 and close auxiliary contacts 143 of a signal circuit. A main control switch 144, shown as being of the push-pull type, is provided for controlling the starting and stopping of the apparatus. This switch has a set of contacts 145, and a set of contacts 146 which are normally closed in the down position of the switch. A set of contacts 137, and a set of contacts 148 are arranged to be closed when the switch is in the up position. An auxiliary switch 149 provides control for wire inching and simultaneously purging the gas line. This switch is of the push type and is provided with normally closed contacts 150, and normally open contacts 151 which are operable to closed position when the switch is depressed.

With the apparatus applied to the workpiece, actuation of the control member 131 to the ON position will operate to clamp the driving mechanism to the workpiece and orient the apparatus into a proper operating position. As thus mounted on the workpiece, the limit switch 140 will be in a position wherein the contacts 142 are closed. At this time, it is desirable to test the wire feed mechanism, and this is done simply by depressing the auxiliary switch 149 so as to close its contacts 151 and simultaneously energized solenoids 135 and 139 to operate the connected valves 134 and 138. This will operate to inch the wire feed, and at the same time purge the gas line. With the torches properly adjusted, the apparatus is ready to proceed with the welding operation. Movement of the apparatus is initiated by pulling the main control switch 144 which will function to close in contacts 147 and 148. A signal light 152 is not connected in circuit with contacts 143 of the limit switch 140, and one side of the electric circuit is now connected with the solenoid coils 135, 137, and 139, whereupon these solenoid coils are energized to operate the valves 134, 136, and 138. The apparatus now begins its operation and will continue until stopped by depressing the switch 144, or reaching the end of the workpiece, whereupon the switch 140 will operate to close its contacts 143 and energize the signal light 152 to indicate to the operator that the apparatus has reached the end of the work operation. The signal light is mounted in the operating handle of the main control switch 144.

During the operation of the apparatus, it may be found necessary to adjust the wire speed in relation to the forward speed of the apparatus along the workpiece. This is accomplished by means of a control knob 153 which is connected to a regulating valve (not shown) in the fluid feed line of the motor 85. The regulated fluid pressure is indicated on a pressure gauge 154. In a similar manner, a control knob 155 is used to regulate a valve (not shown) in the fluid supply line to the motor 22, the pressure in this case being indicated by a pressure gauge 156. It will be appreciated that the readings of the pressure gauges 154 and 156 provide means of comparison so that an operator can adjust the wire speed and forward speed to those comparative values which give the best operation.

From the foregoing description, it is believed that it will be appreciated that the heretofore outlined objects of the invention will be attained, and that the apparatus embodying the described features provides inherent advantages in the carrying out of work operations on an associated workpiece.

Various modifications may suggest themselves to those skilled in the art without departing from the spirit of my invention, and hence, I do not wish to be restricted to the specific form shown or uses mentioned, except to the extent indicated in the appended claims.

I claim:

1. Power propelled apparatus supported as a unit by a workpiece structure including a first plate member and a second plate member oriented in angular relation to said first plate member, said apparatus being adapted for driving and guided movement therealong while effecting cutting, welding and similar operations along a work operation locus line, comprising:
    a. a carriage frame structure supported on one of said workpiece members for movement in a guided path determined by said second plate member;
    b. power means on said frame structure energizable to propel said carriage including a driving member for pressure engagement with one side of said second plate member, said driving member including means coacting with means engaging an opposite side of said second plate member;
    c. tool means carried by said frame structure positioned on one side of said second plate member, said tool means having a head portion positionable adjacent said locus line and being operative to perform a work operation along said locus line during movement of said carriage; and
    d. means engaged with at least one of said plate members for continuously orienting the tool head portion with respect to said locus line during the guided movement of said carriage.

2. Apparatus according to claim 1, wherein the tool comprises a cutting torch for performing a cutting operation along said locus line.

3. Apparatus according to claim 1, wherein the tool comprises a welding torch for making a seam weld along said locus line.

4. Apparatus according to claim 1, wherein the second plate member is straddled by said carriage frame, and the driving member is a wheel engageable with one side of the second plate member.

5. Apparatus according to claim 1, wherein the means on the opposite side of said second plate member from said driving member includes a part engageable and disengageable with respect to said second plate member, and in the engaged position coacts with said driving member to clampingly engage and provide a positive driving connection with said second plate member.

6. Apparatus according to claim 5, wherein the clamping engagement is below the center of gravity of the apparatus.

7. Apparatus according to claim 5, wherein the clamping engagement is forward of the tool means.

8. Apparatus according to claim 1, wherein the carriage frame structure is wheel supported.

9. Apparatus according to claim 1, wherein second similar tool means are positioned on an opposite side of said second plate member for simultaneously performing a work operation along an adjacent locus line.

10. Apparatus according to claim 9, wherein the tool means on the respective sides of said second plate member are in relative staggered operating positions in the direction of movement of said frame structure.

11. Apparatus according to claim 1, wherein the power means comprises a fluid actuated motor.

12. Apparatus according to claim 1, including means for controlling the energization of said power means, said control means including an element normally engaged with the workpiece structure, and upon disengagement being adapted to deenergize said power means.

13. Power propelled welding apparatus for guided movement along workpieces to be joined together along a weld line by a weld, one of said workpieces being a first plate member and the other of said workpieces including a second plate member oriented in angular relationship to said first plate member, comprising:
  a. a carriage frame structure supported for guided movement by said second plate member along said weld line;
  b. power driving means energizable to propel said carriage frame including a driving wheel and coacting means respectively engaged with opposite faces of said second plate member;
  c. a welding torch movably supported on said frame structure, said torch having a welding head positioned adjacent the weld line; and
  d. means for adjusting the position of said torch to vary the relationship of the torch head with respect to said weld line.

14. Apparatus according to claim 13, wherein the adjusting means includes parts for selectively adjusting the normal position of the torch in a lengthwise direction, a lateral direction, and a generally arcuate direction about its welding head.

15. Apparatus according to claim 13, wherein the adjusting means includes at least one pivot supporting the torch for swinging movement, whereby the angular relationship of the axis of the torch head is variable with respect to said weld line.

16. Apparatus according to claim 13, wherein the adjusting means includes tracking means connected with the torch, said tracking means having an element positioned to continuously bear against one of the workpieces adjacent the weld line, and being operative to continuously orient the torch head by pivotally swinging the torch.

17. Apparatus according to claim 16, wherein said element comprises a wheel resiliently urged towards the weld line, said wheel having beveled circumferentially extending opposite peripheral side edges separated by a circumferentially extending groove adapted to overlie said line of weld.

18. Apparatus according to claim 17, wherein the wheel is positionable edgewise in the angle formed by two workpieces in right-angled relation, and with its bevelled side edges respectively engaging the workpieces.

19. Apparatus according to claim 13, wherein the adjusting means includes a torch supporting bracket, said bracket including a part having guided movement in a direction to adjustingly move said torch bodily along said weld line, and means for releasably securing said part in an adjusted position.

20. Apparatus according to claim 13, wherein the adjusting means includes a torch supporting bracket part having a pivot on which the torch is swingable in a plane substantially normal to the weld line, said part having guided adjustable movement in a direction to vary the angular direction of said pivot from said weld line, and means for releasably securing said part in an adjusted position.

21. Apparatus according to claim 13, including means for feeding an electrode wire to said torch welding head.

22. Apparatus according to claim 21, wherein said electrode wire feeding means includes a power driven feed wheel having a circumferentially extending groove for tangentially receiving the wire therein, and an idler wheel for retaining said wire within said groove, said idler wheel having a fixed axis of rotation.

23. Apparatus according to claim 22, wherein said groove has radially inwardly converging sidewalls.

24. Apparatus according to claim 23, wherein the sidewalls of said groove are guidingly supported for movement towards and away from each other, and including adjustable means for resiliently urging said sidewalls towards each other.

25. Apparatus according to claim 21, wherein the wire feeding means are driven by a motor, and including means for varying the feeding speed of said wire feeding means.

26. Apparatus according to claim 21, wherein the wire feeding means are driven by a motor, and including control means for intermittently energizing said motor to provide inching wire feeding operations.

27. Apparatus according to claim 13, including clamping means operable into engaged and non-engaged positions with respect to said other of said workpieces, said clamping means in said engaged position forcibly urging said driving wheel towards the engaged workpiece.

28. Apparatus according to claim 27, in which the clamping means includes a pair of spaced apart clamping wheels carried by a frame structure; and means for moving said frame structure to engage and disengage the clamping wheels with respect to the workpiece, including a parallel motion linkage support for said frame structure.

29. Apparatus according to claim 28, wherein a fluid energizable actuator is operably connected with said linkage.

30. Apparatus according to claim 13, wherein the driving wheel is driven from a motor; and including means for variably controlling the driving speed of said power means.

31. Apparatus according to claim 30, including means operable in response to the apparatus reaching an end of one of the workpieces for deenergizing said motor.

* * * * *